United States Patent Office 3,169,824
Patented Feb. 16, 1965

3,169,824
PROCESS FOR DYEING SOLID POLYOLEFINS, NORMALLY NON-RECEPTIVE TO WATER-SOLUBLE DYES, WITH IONIC DYESTUFFS
Domenick Donald Gagliardi, 185 Howland Road, East Greenwich, R.I.
No Drawing. Filed Aug. 17, 1962, Ser. No. 217,544
11 Claims. (Cl. 8—55)

This invention relates to the coloring of preformed articles composed of solid olefin polymers. More particularly, it concerns (a) the dyeing of fibers, films, fabrics and other shaped articles formed of solid olefin polymers, (b) new dyes for use in the coloring of solid olefin polymers, (c) new coloring compositions for coloring such polymers, and (d) new forms of colored articles of solid olefin polymers.

High molecular weight olefin polymers, particularly polyethylene and polypropylene, although of recent origin, are now used in great quantities because of their low cost, good strength characteristics, high inertness and other attractive properties. These low-cost, high-strength plastics are being molded, extruded or otherwise fabricated into thousands of different types of household and industrial articles. Such synthetic plastic materials were unknown only about two decades ago but their use has become so extensive today they constitute a major item of commerce and they have created many new industries devoted to their fabrication and utilization.

The said olefin polymers can be prepared in a wide range of molecular weights to give products of different strengths and other characteristics. This invention concerns the solid olefin polymers of sufficiently high molecular weight to be fiber-forming. Accordingly, the term "solid olefin polymer" whenever used in this specification or the accompanying claims means polymers of olefins, particularly α-olefins and especially α-olefins of 2 to 4 carbon atoms, having an "inherent viscosity" between about 1.2 and 10, including the fiber-forming homopolymers of α-olefins, typically ethylene and propylene, and fiber-forming copolymers of olefins with other copolymerizable materials, specifically fiber-forming copolymers existing as long-chain synethtic polymers composed of at least 85% by weight of olefin units.

The term "inherent viscosity" used above means the viscosity of a solution of 0.2 gram of the polymer in 50 cc. of tetralin at 130° C.

Various types of solid olefin polymers which may be processed in accordance with the invention are extensively described in the patent and technical literature, e.g., see "Encyclopedia of Chemical Technology," First Supplement volume (1957), pp. 699–712, and Second Supplement volume (1960), pp. 661–672.

Fibers and films constitute a present major use of the new solid olefin polymers. Enormous quantities of these materials are expected to be utilized in the coming years for an ever increasing variety of applications. However, expansion in use of the solid olefin polymers has been retarded to some extent by the extreme difficulty encountered in coloring and ornamenting the polymers with organic and inorganic dyes and pigments. Thus, as is well known, it is extremely difficult to print on or to color solid olefin polymers with dyes or pigments, whether applied from water dispersions, from solvent solutions, as print pastes or the like, because these materials do not adhere well to the solid olefin polymers. Much work has been devoted to devising ways two surmount such coloring and printing problems. This has included preparation of special forms of polymers containing small percentages of added materials designed to render the poylmers more receptive to dyes and pigments, treatment of the finished polymer in various ways, e.g., irradiation with high voltage electrons, flame treatment of the surface, and the development of coloring materials specifically designed for use with solid olefin polymers. Nevertheles, there is a great need for simple, inexpensive and highly effective methods of coloring solid olefin polymers.

A principal object of this invention is the provision of new processes for the coloring of preformed articles composed of solid olefin polymers. Further objects include:

(1) The provision of new processes for coloring fibers, yarns, fabrics, film and other shaped articles of solid olefin polymers in deep shades with the color of the resulting products being resistant to removal by washing, dry cleaning or other cleansing or handling to which the polymer article may be subjected in their normal use.

(2) The provision of new ionic textile coloring materials which are capable of dyeing fibers, films and other preformed articles of solid olefin polymers in deep shades without recourse to special chemical modification of the polymer molecules or pretreatment of the polymer articles in order to render the articles receptive to the coloring material.

(3) The provision of new coloring compositions particularly useful in the coloring of solid olefin polymers.

(4) The provision of new and novel forms of colored preformed articles of solid olefin polymers.

(5) The provision of new methods for dyeing or otherwise coloring preformed articles of solid olefin polymers that may be carried out in equipment conventionally available and which can be used in conjunction with conventional textile finishing operations.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The foregoing objects are accomplished according to the present invention by coloring preformed articles composed of solid olefin polymers with colored compounds formed of an oleophilic ion and a chromophoric ion of opposite charge to the charge of said oleophilic ion.

The new processes for coloring preformed articles composed of solid olefin polymers may be advantageously carried out by providing a liquid composition containing a colored salt formed of an oleophilic ion, as herein defined, and a chromophoric ion, as herein defined, contacting the preformed article with such liquid composition, heating the article while in contact with the colored salt to a temperature between about 10° C. below the melting point of the olefin polymer and 90° C., separating the article resulting from the heating step from any removable residue of the liquid colored salt composition and finally recovering the resulting colored preformed article.

The heating of the article while in contact with the colored compound as above defined is advantageously carried out for about 10 to 120 minutes within the temperature range as above prescribed.

The contacting of the preformed article with the colored compound containing composition and the heating of the article while in contact with the colored compound may advantageously be accomplished by immersing the preformed article in a bath of the liquid composition and heating the bath and the immersed article to the desired temperature, applying pressure, if necessary, to maintain the coloring composition liquid.

The coloring of the polyolefin articles may also advantageously be carried out by applying the colored ionic compound as a solution in water or an organic solvent to the polyolefin article, heating the article to a temperature to evaporate the solvent and leave the colored ionic compound upon the surface of the article and then heating the article while in contact with the colored compound according to the time and temperature conditions as described above.

The new coloring processes may also advantageously be carried out by forming a colored ionic salt in situ on the preformed polyolefin article by reaction of a textile dye (D)(S) and a compound (M)(Y) to form a colored salt (D)(Y) by the following reaction:

$$(D)(S) + (M)(Y) \rightarrow (D)(Y) + (M)(S)$$

In this formula, (D) is the colored ion portion of the dye molecule which may have a positive or negative charge, (S) is the water-solubilizing ion of the dye, (Y) is a non-colored oleophilic ion which will have a negative or positive charge opposite to the charge of the dye molecule (D) and (M) is a water-solubilizing ion of the reactive compound (M)(Y). Where the oleophilic ion (Y) is positively charged, it may be, for example, an alkyl ammonium cation, an alkyl phosphonium cation, a Werner complex cation, or an alkyl amine cation. Where it is negatively charged, it may be a sulfocarboxylate ion, a sulfonate ion, a carboxylate ion, a halocarboxylate ion, an organophosphate ion, an alkylphenolate ion or an aminocarboxylate ion.

The chromophoric portion (D) of the colored compound (D)(Y) may be the direct dyestuff anions, the basic dyestuff cations, the acid wool dye anions, the dispersed dye cation containing amino groups, the fiber-reactive dyestuff anions, the metallized dyestuff anions, the sulfonated phthalocyanine anions, the phthalocyanine quaternary cations, the vat ester anions, the aniline black cations, and the naphthol dye anions. When the (D) colored ion is positively charged, then the colorless oleophilic ion is negatively charged and is selected from the aforementioned anionic groups. When the (D) colored ion is negatively charged, then the colorless oleophilic ion is positively charged and is selected from the aforementioned cationic groups.

In applying coloring compositions, solutions, dispersions or print pastes to polyolefin material, the conventional dyeing and printing techniques used in the industry may be employed. After application of the coloring medium containing the (D)(Y) coloring agent, the polyolefin material may be heated at elevated temperatures, may be put under pressure, may be steamed, and the like, to allow diffusion of the coloring agent into at least a portion of the polyolefin to be colored. After coloration has occurred, the treated polyolefin may be scoured to remove residual chemicals and dried or further treated with finishing agents.

The new processes may be applied to polyolefin films, continuous filaments of polyolefins, yarns spun from staple fibers of polyolefins, fabrics woven or knit from such filaments or yarns, molded polyolefin articles or other preformed articles composed of solid olefin polymers. The new coloring processes are particularly useful for the coloring of solid polymers of 2 to 4 carbon atom olefins, typically, polyethylene or polypropylene.

The treated products resulting from the aforesaid application of ionic colored salts and heating are new forms of articles composed of solid olefin polymers which are colored in deep shades that are wash-fast, fast to dry cleaning, and resistant to removal when the article is subjected to other forms of cleansing or handling normally encountered by the article in ordinary use. Such new products typically have the surface thereof imbued with about 0.01 to 5% by weight of coloring material.

The colored ionic compound as hereinbefore defined may be applied to the preformed polyolefin article as a solution in an organic solvent, as an aqueous dispersion or emulsion, or in liquid or molten form. The application can be carried out by impregnating, spraying, coating, infusing or in any other suitable fashion. The operation may be modified with preliminary, simultaneous or subsequent auxiliary processes and agents including wetting agents, leveling agents, thickening agents, anticrocking agents, emulsifiers, water repellents, oil repellents and the like. If only small amounts of the ionic colored salt are used or if residue thereof is not detrimental, the resulting colored polyolefin article may be used directly for subsequent coating or other processing. Alternatively, the colored article may be scoured or otherwise cleansed to remove any removable residue which does not become sufficiently firmly affixed to the polyolefin to prevent its being removed by ordinary cleansing or handling.

A further understanding of the new processes and resulting products of this invention may be had by reference to the following examples of operation in accordance with the invention. In these examples and throughout the remainder of the specification and claims, all parts and percentages are by weight unless otherwise specified.

*Example 1*

Cationic dye (D)(S)
Malachite Green—Color Index No. 42000:

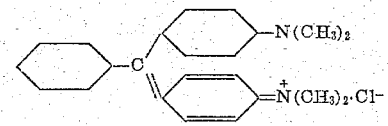

Reacted with anionic agent (M)(Y):
Dibutyl acid phosphate:

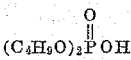

To give the (D)(Y) coloring agent:

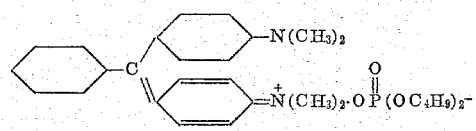

Plus the by-product (M)(S); which in this case is HCl.

The butylphosphoric acid salt of Malachite Green Base was prepared by dissolving 4.5 parts of the Malachite Green Base (Color Index Solvent Green 1) and 4.6 parts of butyl phosphoric acid (acid No. 430) in 167 parts of isopropanol and 2680 parts of water. The mixture was heated at 70° C. until a clear dark green solution formed. This solution was applied to a fabric woven from polypropylene fibers, by padding, which was then dried for 10 minutes at 120° C. After scouring with a 0.1% non-ionic detergent and 0.25% sodium carbonate at 60° C., it was found that the polypropylene fabric was colored deep green and was fast to washing. A similar polypropylene control fabric treated with the free Malachite Green Base and washed was completely uncolored.

In another case, a piece of polypropylene fabric was padded through the same solution and was then steamed for 2 hours at 95° C., scoured, rinsed and dried. The final fabric was deeply colored green. The color was fast to washing.

*Example 2*

Anionic dye (D)(S)
Acid Orange—Color Index No. 13025:

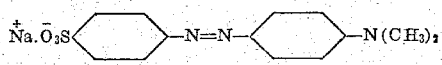

Reacted with cationic agent (M)(Y):
N-dodecyl propylene diamine acetate:

To give the (D)(Y) coloring agent:

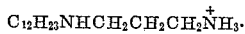

Plus the by-product (M)(S); which in this case is NaOOCCH$_3$

An aqueous dispersion containing about 5% of the N-dodecyl ethylene diamine salt of the acidic dye Acid Orange was prepared by mixing about equal amounts of the two ingredients in a mixture of equal parts of water and isopropanol containing about one percent of octylphenol ethylene oxide non-ionic dispersing agent. The resulting water dispersion was padded onto a fabric woven of polyethylene monofilaments to give a pick-up of about 50% based upon the dry weight of the fabric. The dispersion wet fabric was then air dried in an oven at 50° C. for 3 hours and then heated in another oven at 105° C. for one hour. The fabric was removed from the oven, rinsed in water, scoured in 2% soda ash solution, rinsed again in water and air dried. The fabric was colored a deep orange and retained this color after repeated washings.

*Example 3*

Anionic dye (D)(S)
Direct Orange 71—Color Index No. 40205:

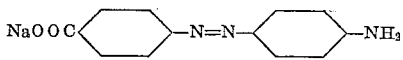

Reacted with amphoteric agent (M)(Y):
N-dodecyl aminopropionic acid:

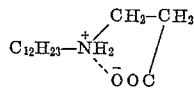

To give the (D)(Y) coloring agent:

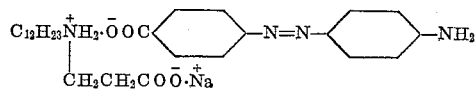

Using a procedure generally similar to the one described in Example 2, an aqueous dispersion of this coloring agent was prepared and used to color polyethylene fiber fabric an orange color which was colorfast to washing.

*Example 4*

Cationic dye (D)(S)
Chrysoidine OPH—Color Index No. 11280:

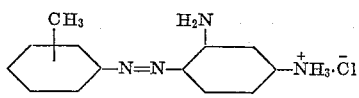

Reacted with amphoteric agent (M)(Y):
N-stearyl glycine:

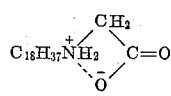

To give the (D)(Y) coloring agent:

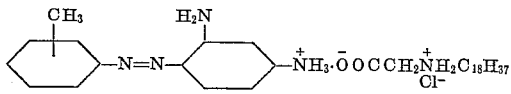

The procedure of Example 2 was repeated to form the indicated new coloring agent and dye polyethylene fiber fabric.

*Example 5*

Disperse dye (D)(S)
Disperse Yellow 9—Color Index No. 10375:

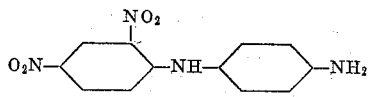

Reacted with anionic agent (M)(Y)
Sulfolauric acid:

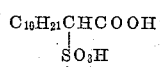

To give the (D)(Y) new coloring agent:

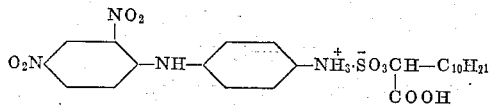

A print paste was prepared to contain 5 parts of sulfolauric acid, 2.5 parts of methyl cellulose, 89.5 parts of water and 3 parts of Disperse Yellow dye by thorough mixing and homogenizing of the ingredients. The print paste was printed onto fabric woven with weft threads of cotton and woof threads of polyethylene monofilaments. The printed fabric was then heated at 120° C. for 30 minutes, scoured in synthetic detergent solution, rinsed and dried. The print produced was fast to washing on both the cotton threads and polyethylene filaments.

*Example 6*

The butyl acid phosphate salt of Malachite Green Base was prepared in a mixture of 50 mls. of isopropanol and 50 mls. of toluene by dissolving therein 9.87 grams of the dye base and 3.90 grams of the butyl acid phosphate (0.03 mole of each). After heating at 50° C. for one hour, a clear product formed. The solution was evaporated on a water bath and dried at 95° C. for 90 minutes until free of solvents. There was obtained 11.58 grams of the dry solid butyl acid phosphate salt of Malachite Green Base. A 1% isopropanol solution of the reaction product was coated on a film of polyethylene which was dried at 95° C. for 30 minutes, scoured and dried. The film was green colored.

*Example 7*

A water dispersion of the N-dodecyl ethylene diamine salt of the acid dye Wooncolan Black NWA was prepared by mixing the two ingredients in a mixture of water and isopropanol containing a non-ionic dispersing agent, namely, 3 parts of the diamine, 3 parts of the dye, 1 part of octylphenol-ethylene oxide condensate and 93 parts of a 50–50 isopropanol-water mixture. The final solution was padded onto a polyethylene monofilament fabric which was then steamed under pressure at 105° C. for one hour, rinsed and dried. The monofilaments were dark grey colored by the treatment.

*Example 8*

A water solution of 5 parts of the Werner chrome complex of N-stearyl aminopropionic acid was mixed with a water solution of the fiber reactive dye, Procion Brilliant Blue (1 part) containing 1 part of a polyethylene oxide leveling agent to a total of 100 parts by weight of total bath. The resulting aqueous dispersion was padded onto a piece of fabric made of polypropylene fibers. After heating at 120° C. for 15 minutes, the fabric was scoured, rinsed and dried. It was uniformly colored a deep blue.

*Example 9*

A color coating composition containing 3 parts of the anionic direct dye Superlitefast Brown 3RLL, 6 parts of amphoteric N-lauryl aminopropionic acid and 2 parts of methyl cellulose dispersed in 89 parts of water was knife coated on a film of polypropylene. After drying for 30 minutes at 105° C., the film was scoured in hot water and dried. The coated side was deeply colored a dark tan color.

Example 10

A print paste was prepared to contain:

5 parts of rosin amine acetate
2.5 parts of hydroxyethyl cellulose
89.5 parts of water
3 parts of Wooncolan Green BN acid dye After thorough mixing and homogenizing, the print paste was printed on a piece of polypropylene fabric, which was then heated at 120° C. for 15 minutes, scoured in a synthetic detergent and soda ash solution at 60° C., and dried. The print produced was fast to washing.

Example 11

A print paste was prepared to contain:

5 parts of sulfostearic acid
2.5 parts of hydroxyethyl cellulose
89.5 parts of water
3 parts of the basic dye Crystal Violet After simple mixing and stirring, this paste was printed on a sample of polypropylene fabric, which was then air dried and cured for 15 minutes at 120° C. After scouring with synthetic detergent and soda ash, a fast clear violet print pattern was formed on the cloth. This was durable to washing and dry cleaning.

Example 12

A print paste was prepared to contain:

5 parts of the chrome complex of N-dodecyl aminopropionic acid
2.5 parts of methyl cellulose
89.5 parts of water
3 parts of the direct dye Superlitefast Blue GL After mixing, the print paste was printed on a polypropylene fabric, steam heated, and dried at 120° C. for 15 minutes. After scouring off the excess print paste, the fabric was found to be printed with a blue pattern.

Example 13

A solution of the sulfolauric acid salt of Hidaco Blue basic dye was prepared by dissolving 1 part of sulfolauric acid and 1 part of the dye in a mixture of 20 parts isopropanol and 78 parts of water. The solution was applied to fabric woven of polypropylene fibers by padding. After air drying at room temperature for one hour, the fabric was heated at 120° C. for 10 minutes, scoured, rinsed and dried. A good level blue dyeing was obtained.

Colored ionic compounds that are useable in accordance with the invention contain an oleophilic group in the colored molecule. The effectiveness of an oleophilic group and any substance containing such for use in forming a colored ionic compound to be employed in coloring solid olefin polymers with the new procedures may be readily determined by making a few test runs with any ionic dyestuff prepared and used in accordance with the general procedure discussed herein. With the new mode of operation in coloring solid olefin polymers made known by the foregoing discussion, those skilled in the art will be able to list many available materials which can be employed in forming the required colored ionic compounds and in using these materials in the coloring of polyolefins. As a general measure of the applicability of a compound to provide the oleophilic ion of the required colored ionic compound, the oleophilic material from which the ion is derived should have a solubility of at least about 1 part in 100 parts of hexane at 20° C.

Specific classes of materials which may be used to provide the oleophilic ion portions of the new colored ionic dyestuffs include:

*Organo nitrogen compounds.*—Useable cations of this group are obtainable by quaternization of alkyl monoamines, alkyl polyamines, aryl monoamines, aryl polyamines, cycloalkyl monoamines, cycloalkyl polyamines and heterocyclic nitrogen compounds containing 6 to 44 carbon atoms and possessing an oleophilic property as hereinbefore defined. Specific examples of useable cations are those formed by reaction of an inorganic acid, e.g., HCl or an organic acid, e.g., acetic acid, with any of the following:

Dodecylamine
Hexylamine
Octadecylamine
Tallowamine
Cocoamine
Hydrogenated tallowamine
N-methyl dodecylamine
N-cyclohexyl octadecylamine
N-4-hydroxyphenyl N-ethyl octadecylamine
N-dodecyl ethylene diamine
N-hexyl propylene diamine
N-aminopropyl hexadecylamine
Triacontanylamine
N-carbethyoxy octadecylamine
N-ethyl aniline
Naphthylamine
N,N-dihexyl aniline
N-phenyl-N-4 chlorophenyl octylamine
Cyclohexyl amine
Rosin amine
N-dodecyl cyclohexylamine
5-octadecyl pyrimidine
2-phenyl-3-dodecyl pyridine Also of particular importance are amphoteric ions of aminoacids containing 6 to 22 carbon atom radicals, including the following:

N-stearyl glycine
N-dodecyl aminopropionic acid
N-hexyl leucine
N-octadecyl-N-carboxypropyl glycine
N-octadecyl proline
N,N-dihexyl alanine
6-aminohexyl-N-carboxyethyl stearyl amine
1-decyl-2-carboxy piperazine
N-cocoalkyl glycine
N-carboxymethyl coconut oil alkyl amine

*Werner complex cations of amino fatty acids.*—Complex cations of the general formula:

wherein R is an alkyl or alkenyl radical containing at least 6 carbon atoms,

R' is a hydrogen, alkyl, cycloalkyl, aryl or carboxyalkyl radical,

R" is an alkylene, aralkylene or aminoalkylene radical, and

X is a halogen radical, particularly chlorine.

Specific examples include the cations from Werner chrome complexes formed of any of the amino acids listed above.

*Sulfo organic compounds.*—Useable anions of this class may be derived from sulfo carboxylic acids having a molecular weight between about 140 and 1000, particularly anions of the formula:

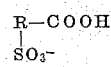

wherein R is a hydrocarbon radical containing 1–18 carbon atoms. Specific examples are the anions from the following sulfocarboxylic acids:

α-Sulfostearic acid
α-Sulfolauric acid
3-sulfocaproic acid
3-sulfophthalic acid
6-sulfohexoic acid
5-sulfonaphthoic acid
2-sulfo-3-phenyl propionic acid
4-sulfo hexahydrosalicylic acid
2,12-disulfostearic acid
α-Cyclohexyl-α-sulfo acetic acid Useable anions of this class may also be derived from sulfonic acids of the general formula:

$$R-SO_3H$$

wherein R is a hydrocarbon radical of between about 6 and 44 carbon atoms, particularly such acids of which the sodium salt is water soluble. Specific examples include the following:

Dodecyl benzene sulfonic acid
α-Dodecyl sulfonic acid
p-Diphenyl sulfonic acid
5-amyl naphthalene-2-sulfonic acid
Keryl benzene sulfonic acid
4-cyclohexyl sulfonic acid Useable anions may also be derived from organic sulfuric acids of the general formula:

$$R-O-SO_3H$$

wherein R is a hydrocarbon radical of between about 6 and 44 carbon atoms. Specific examples include the following:

Lauryl sulfuric acid
Stearyl sulfuric acid
Cocoalkyl sulfuric acid
Phenylethyl sulfuric acid
Cyclohexyl propyl sulfuric acid

*Organo phosphoric compounds.* — Useable anions of this class may be derived from organic phosphoric acids having the general formula:

$$\begin{array}{c} O \\ \parallel \\ R-P-OH \\ | \\ R' \end{array}$$

wherein R is an alkyl, aryl, alkoxy or aryloxy radical and R' is a hydroxy, alkyl, aryl, alkoxy or aryloxy radical, especially such radicals containing 2 to 20 carbon atoms. Specific examples include anions of the following phosphoric acids or acid esters:

Propyl phosphoric acid
Diamyl phosphoric acid
Octadecyl phosphoric acid
Dioctyl acid phosphate
Methyl phenyl phosphoric acid
Benzyl phenyl phosphoric acid
Cyclohexyl phosphoric acid
Glycerol phosphoric acid
p-Hexyl phenyl methyl phosphoric acid

*Carboxylate compounds.*—Useable anions of this class may be derived from carboxylic acids, particularly monocarboxylic acids, containing a hydrocarbon radical or a halohydrocarbon radical having between about 6 and 44 carbon atoms. Specific examples include the following:

Stearic acid
Lauric acid
α-Chloro stearic acid
p-Isopropyl benzoic acid
2-naphthoic acid
Pentachloro naphthoic acid
α-Dichlorophenyl acetic acid
4-cyclohexyl lauric acid
p-Phenyl benzoic acid
Capric acid
Keryl benzoic acid
3-dodecyl phthalic acid
3-dodecyl methyl acid phthalate

*Alkyl phenolates.*—Useable anions of this class may be derived from alkyl phenols in which the alkyl group or groups contain at least about 6 carbon atoms, typically 6 to 24 carbon atoms. Specific examples include:

p-Hexyl phenol
2-dodecyl naphthol
4-octadecyl-2-chlorophenol
4'-dodecyl-4-hydroxy diphenyl The chromophoric ion of the colored salts to be used in the new polyolefin dyeing procedures have a charge opposite to the charge of the oleophilic ion portion of the colored molecule. Such chromophoric ions may be derived from the following general classes of dyestuffs:

*Direct dyes.* — Specific examples of such anions are those from:

Wine-red direct dye "Cuprofix Bordeaux" (Sandoz)
Red direct dye "Superlitefast Red 3BL" (Althouse Co.)
Brown direct dye "Metromine RF Brown BRL" (Metro-Atlantic Inc.)
Brown direct dye "Superlitefast Brown 3RLL" (Althouse Co.)
"Direct Orange 71"—Color Index No. 40205

*Acid wool dyes.*—Specific examples of such anions are those from:

Black acid dye "Wooncolan Black WA" (Woonsocket Color and Chemical Co.)
Green acid dye "Anthraquinone Green GNN" "Acid Orange"—Color Index No. 13025

*Fiber reactive dyes.* — Specific examples of anions of this group are those from:

Cellulose reactive dye "Procion Brilliant Red" (Arnold Hoffman Co.)
Sulfone fiber reactive dye "Remazol Brilliant Blue R" (Hoechst)
Fiber reactive dye "Procion Brilliant Blue" (Arnold Hoffman Co.)

*Metallized dyes.*—Specific examples of anions of this group are those from:

Red premetallized acid dye "Capracyl Red B" (Du Pont)
Red premetallized acid dye "Calcocid Red" (Cyanamid)
Orange premetallized acid dye "Calcocid Orange Y" (Cyanamid)

*Sulfonated phthalocyanine dyes.*—Specific examples of anions of this group are those from:

"Heliogen Blue SBL" (I.G.)
"Durazol Fast Blue 8GS" (I.G.)
"Monsol Fast Blue 2GS" (I.C.I.)

*Naphthol dyes.* — Specific examples of anions of this group are those from:

(A) "Naphthol AS"—C.I. 37505
    "Naphthol AS–BG"—C.I. 37545
    "Naphthol AS–BO"—C.I. 375
(B) "Azoic Diazo 1"—C.I. 37135
    "Azoic Diazo 2"—C.I. 37005
    "Azoic Diazo 3"—C.I. 37010

*Vat dyes.*—Specific examples of anions of this group are those from:

Green vat dye, "Jade Green"
"Soluble vat dye, "Algosol Red IFBB–CF"
Soluble vat dye, "Algosol Green IBW"
"Soluble vat dye, "Algosol Golden Yellow IGK–CF"

*Sulfur dyes.*—Specific examples of anions of this group are those from:

"Sulfur Yellow"—C.I. 53160
"Immedial Pure Blue"—C.I. 53430
"Sulfur Blue 7"—C.I. 53440

*Dispersed dyes.* — Specific examples of cations of this group are those from:

"Disperse Yellow 9"—C.I. 10375
"Disperse Blue 28"—C.I. 62065
"Cellitazol BGL"—C.I. 11245

*Phthalocyanine quaternary dyes.*—Specific examples of cations of this group are those from:

"Alcion Green" (I.C.I.)
"Alcion Blue" (I.C.I.)

*Aniline black dyes.*—Specific examples of cations of this group are those from:

"Aniline Black"—C.I. 50440
"Oxidation Base 19"—C.I. 76005
"Oxidation Base"—C.I. 76015
"Oxidation Base"—C.I. 76040

*Basic dyes.*—Specific examples of cations of this group are those from:

"Malachite Green"—C.I. No. 42000
"Chrysoidine OPH"—C.I. No. 11280
"Regina Purple"—C.I. No. 42515
"Basic Green"—C.I. No. 42040
"Basic Blue"—C. I. No. 51180
"Calcozine Red"—C.I. No. 50240
"Basic Yellow 3"—C.I. No. 41005
"Crystal Violet"—C.I. No. 42555
"Caribbean Blue"—C.I. No. 42140
"Genacryl Yellow"—C.I. No. 41000

In preparing compositions for use in coloring polyolefins with colored salts as hereinbefore defined, the colored salts may be used in various fluid media and in various concentrations. Particularly useful results are obtained using a concentration of between 0.01 to 100 parts of the colored salt for each 100 parts of solvent. Water may be used as the solvent for preparing the coloring compositions with many of the colored salts. In other cases, mixtures of water with water-miscible organic solvents make satisfactory solution media. Mixtures of water with 1 to 6 carbon atom alkanols in a proportion of 1 to 100 parts of alkanol per 100 parts of water are particularly useful. The coloring compositions may also contain polyolefin swelling agents in a proportion, for example, of about 0.01 to 20 parts of the swelling agent to each 100 parts of coloring composition.

The coloring compositions may also contain surfactants and with aqueous systems, non-ionic dispersing agents are a particularly useful material of this type. Specific examples of such surfactants include polyethylene oxide polymers, polyether alcohols, alkyl phenoxy polyoxyalkylene alkanols, polyoxyalkylene hexitan esters and the like.

The dyeing of polyolefin fibers, fabrics, films or the like may be carried out using the indicated coloring compositions upon machines conventional in the art of textile dyeing, e.g., gig, beck, pad-steam range and pressure dyeing equipment. Conventional dyeing assistants, such as leveling agents, surfactants as mentioned above, alkali salts, dyefixing agents and the like may be used in the process to provide modified effects as may be desirable by the textile finisher. Such materials typically will be used in an amount of about 0.1 to 20 parts per 100 parts of coloring composition.

Dyeing may be conducted with various dyebath to fabric ratios, generally about 10:1 to 100:1. Normal dye temperatures and other conventional conditions used in dye operations may typically be employed.

To ensure relatively permanent fastness to the final dyed material, the coloring material should be set upon the substrate after application as indicated. This setting is most advantageously accomplished by heating the article while in contact with the coloring material to an elevated temperature, particularly between about 30° to 120° C., for a period of about 1 to 120 minutes, preferably 1 to 15 minutes. The exact conditions of setting may be determined utilizing the principles of operation as disclosed herein, by making a few preliminary test runs. Precise conditions employed will be governed to some extent by the degree of coloring desired and similar considerations. The setting of the coloring material on the polyolefin substrate may be effected by other ways than direct heating, e.g., flash diffusion of the treating agent under pressure, use of superheated steam, use of radiant energy or the like.

Normally, the polyolefin article after the coloring or dyeing operation is scoured or otherwise treated to remove surplus coloring material. For this purpose, conventional textile scouring techniques, dry-cleaning techniques or the like may be employed. Such cleaning procedures are generally followed by rinsing or drying, but the coloring or dyeing may be immediately followed by other fabrication steps without cleaning the surplus coloring agent from the article surface. This is particularly true where the surplus coloring agent would have no detrimental effect upon subsequent operations which could include lacquering, laminating, application of antistatic agents or the like.

The new dyeing operations of the invention may be used for coloring mixed fiber fabrics, e.g., fabrics in which polyolefin fibers are woven in admixture with other natural or synthetic fibers including polyester fibers, nylon, silk, cotton or the like. However, the new operations and compositions are particularly advantageous in coloring fabrics, films or the like made wholly of solid polyolefin materials which are not receptive to and/or not normally retain conventional dyes, pigments and related coloring materials.

I claim:

1. A process for coloring polypropylene fibers which comprises:
   (a) providing an aqueous dye solution consisting essentially of about 0.1 to 5 parts of the butylphosphoric acid salt of the dye base C.I. No. 42000, 1 to 10 parts of isopropanol and 100 parts of water,
   (b) padding polypropylene fibers with said solution,
   (c) drying and heating the padded fibers for about 5 to 15 minutes at between about 105° and 120° C.,
   (d) scouring the resulting dyed fibers in an aqueous wash bath to free them of any removable residue of said aqueous dye solution, and
   (e) recovering the resulting green colored polypropylene fibers which are colorfast to washing.

2. A process for coloring preformed articles composed of solid olefin polymer, normally non-receptive to water-soluble dyes, in deep shades that are wash-fast which comprises:
   (A) providing a liquid composition containing a colored salt formed of an oleophilic ion and a chromophoric ion having a charge opposite to the charge of said oleophilic ion,
   (B) said oleophilic ion being selected from the group consisting of:
      (a) sulfocarboxylic ions having a molecular weight between about 140 and 1000 containing a hydrocarbon group containing 1 to 18 carbon atoms,
      (b) organophosphorous ions of the formula:

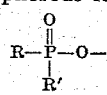

wherein R is a radical selected from the group consisting of alkyl, aryl, alkoxy, and aryloxy radicals containing 2 to 20 carbon atoms, and R' is a radical selected from the group consisting of hydroxy, alkyl, aryl, alkoxy and aryloxy radicals, (c) amino alkyl carboxylic ions containing 6 to 22 carbon atoms, (d) ions of Werner chrome complex of an amino alkyl carboxylic acid containing 6 to 22 carbon atoms, (e) quaternary ammonium ions of hydrocarbon amines containing 6 to 44 carbon atoms, (f) hydrocarbon carboxylic ions containing 6 to 44 carbon atoms, (g) halohydrocarbon carboxylic ions containing 6 to 44 carbon atoms, and (h) alkyl phenolate ions containing 6 to 24 carbon atoms, (C) contacting a preformed article composed of solid olefin polymer normally non-receptive to water-soluble dyes with said liquid composition, (D) heating the article white in contact with said colored salt to a temperature between about 10° C. below the melting point of said olefin polymer and 90° C. for between about 1 to 120 minutes, (E) separating the article resulting from said heating step from any removable residue of said liquid composition, and (F) recovering the resulting colored article.

3. A process as claimed in claim 2 wherein said heating step (c) is conducted to first dry the solution wet article and then heat the article with the non-volatile components of the solution adhering to the article surface.

4. A process as claimed in claim 2 wherein said contacting step (b) is performed by immersing said preformed article in a bath of said liquid composition and said heating step (c) is conducted by heating the bath to the desired temperature with the preformed article immersed therein.

5. A process as claimed in claim 2 wherein said liquid composition is substantially anhydrous and comprises an organic solvent for said colored salt.

6. A process as claimed in claim 2 wherein said liquid composition is a thickened print paste.

7. A process of dyeing fibers formed of solid olefin polymer normally non-receptive to water-soluble dyes in deep, wash-fast shades which comprises:

(A) providing an aqueous dyebath containing a colored salt of:

(a) a water-soluble cationic dye, and (b) a sulfocarboxylic acid having a molecular weight between about 140 and 1000 of the formula:

$$\text{R--COOH} \atop \text{SO}_3\text{H}$$

wherein R is a hydrocarbon radical containing 1 to 18 carbon atoms, (B) immersing fibers formed of solid olefin polymer normally non-receptive to water-soluble dyes in said aqueous dyebath, (C) heating the fibers in the dyebath at a temperature up to about 95° C. for up to about 2 hours until the fibers are colored a deep shade, (D) removing the fibers from said dyebath, and (E) scouring and drying the resulting colored fibers.

8. A process of dyeing fibers formed of solid olefin polymer normally non-receptive to water-soluble dyes in deep, wash-fast shades which comprises:

(A) providing an aqueous dyebtath containing a colored salt of:

(a) a water-soluble cationic dye and (b) an organic phosphoric acid of the formula:

$$\text{R--}\overset{\text{O}}{\underset{\text{R}'}{\overset{\|}{\text{P}}}}\text{--OH}$$

wherein R is a radical selected from the group consisting of alkyl, aryl, alkoxy, and aryloxyl radicals containing 2 to 20 carbon atoms and R' is a radical selected from the group consisting of hydroxy, alkyl, aryl, alkoxy and aryloxy radicals, (B) immersing fibers formed of solid olefin polymer normally non-receptive to water-soluble dyes in said aqueous dyebath, (C) heating the fibers in the dyebath at a temperature up to about 95° C. for up to about 2 hours until the fibers are colored a deep shade, (D) removing the fibers from said dyebath, and (E) scouring and drying the resulting colored fibers.

9. A process of dyeing fibers formed of solid olefin polymer normally non-receptive to water-soluble dyes in deep, wash-fast shades which comprises:

(A) providing an aqueous dyebath containing a colored salt of:

(a) a water-soluble anionic dye, and (b) an alkylene diamine containing 6 to 44 carbon atoms, (B) immersing fibers formed of solid olefin polymer normally non-receptive to water-soluble dyes in said aqueous dyebath, (C) heating the fibers in the dyebath at a temperature up to about 95° C. for up to about 2 hours until the fibers are colored a deep shade, (D) removing the fibers from said dyebath, and (E) scouring and drying the resulting colored fibers.

10. A process of dyeing fibers formed of solid olefin polymer normally non-receptive to water-soluble dyes in deep, wash-fast shades which comprises:

(A) providing an aqueous dyebath containing a colored salt of:

(a) a water-soluble cationic dye, and (b) an amino alkyl carboxylic acid containing 6 to 22 carbon atoms, (B) immersing fibers formed of solid olefin polymer normally non-receptive to water-soluble dyes in said aqueous dyebath, (C) heating the fibers in the dyebath at a temperature up to about 95° C. for up to about 2 hours until the fibers are colored a deep shade, (D) removing the fibers from said dyebath, and (E) scouring and drying the resulting colored fibers.

11. A process of dyeing fibers formed of solid olefin polymer normally non-receptive to water-soluble dyes in deep, wash-fast shades which comprises:

(A) providing an aqueous dyebath containing a colored salt of:

(a) a water-soluble anionic dye, and (b) a Werner chrome complex of an amino alkyl carboxylic acid containing 6 to 22 carbon atoms, (B) immersing fibers formed of solid olefin polymer normally non-receptive to water-soluble dyes in said aqueous dyebath, (C) heating the fibers in the dyebath at a temperature up to about 95° C. for up to about 2 hours until the fibers are colored a deep shade, (D) removing the fibers from said dyebath, and (E) scouring and drying the resulting colored fibers.

References Cited by the Examiner

UNITED STATES PATENTS

| | | | |
|---|---|---|---|
| 2,830,043 | 4/58 | Merian | 260—207.5 |
| 2,944,871 | 7/60 | Atkinson et al. | 8—1.2 |
| 2,984,634 | 5/61 | Caldwell et al. | 8—55 |
| 2,989,358 | 7/61 | Jurgeleit | 8—41 |
| 3,023,072 | 2/62 | Dabrowski | 8—55 |
| 3,039,840 | 6/62 | Sawaya | 8—55 |

NORMAN G. TORCHIN, *Primary Examiner.*

ABRAHAM H. WINKELSTEIN, *Examiner.*